United States Patent
Izawa et al.

(10) Patent No.: US 7,666,266 B2
(45) Date of Patent: Feb. 23, 2010

(54) SURFACE CONDITIONING PRIOR TO CHEMICAL CONVERSION TREATMENT OF A STEEL MEMBER

(75) Inventors: Masaru Izawa, Kobe (JP); Kunio Godo, Kobe (JP); Yoshihisa Ujita, Wakayama (JP); Noriko Ujita, legal representative, Wakayama (JP); Takahiro Takano, Wakayama (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 245 days.

(21) Appl. No.: 11/445,151

(22) Filed: Jun. 2, 2006

(65) Prior Publication Data

US 2007/0056656 A1 Mar. 15, 2007

Related U.S. Application Data

(63) Continuation of application No. PCT/JP2004/018123, filed on Dec. 6, 2004.

(30) Foreign Application Priority Data

Dec. 4, 2003 (JP) .............................. 2003-406017

(51) Int. Cl.
C23C 22/78 (2006.01)
C23C 22/18 (2006.01)
C23C 22/00 (2006.01)

(52) U.S. Cl. ...................... 148/254; 148/243; 148/253; 148/262; 106/14.05; 106/14.12; 428/432

(58) Field of Classification Search ................ 148/243, 148/253–254, 262; 106/14.05, 14.12; 428/432
See application file for complete search history.

(56) References Cited

U.S. PATENT DOCUMENTS

| | | | |
|---|---|---|---|
| 3,510,365 A | 5/1970 | Rausch et al. | |
| 5,728,235 A | * 3/1998 | Boulos et al. | ............... 148/257 |

FOREIGN PATENT DOCUMENTS

| | | | |
|---|---|---|---|
| EP | 0 091 627 | | 10/1983 |
| EP | 0 786 616 | | 7/1997 |
| GB | 878307 | | 9/1961 |
| JP | 53-142934 | | 12/1978 |
| JP | 57-082478 | | 5/1982 |
| JP | 60-121385 | | 6/1985 |
| JP | 61048579 | * | 3/1986 |
| JP | 5-40034 | | 9/1989 |
| JP | 1219173 | * | 9/1989 |
| JP | 2-271000 | * | 11/1990 |

(Continued)

Primary Examiner—Roy King
Assistant Examiner—Lois Zheng
(74) Attorney, Agent, or Firm—Clark & Brody

(57) ABSTRACT

By subjecting a threaded joint for OCTG (oil country tubular goods) to surface conditioning with an aqueous solution of potassium tetraborate or sodium tetraborate prior to manganese phosphate chemical conversion treatment, a manganese phosphate chemical conversion coating having coarse crystal grains with an average crystal grain diameter of 10-110 micrometers is formed on the surface of the steel member which may be any steel including a high Cr steel. This manganese phosphate chemical conversion coating can hold a large amount of a liquid lubricant, and it is effective at preventing the occurrence of galling at the time of makeup of a threaded joint for OCTG.

1 Claim, 1 Drawing Sheet

FOREIGN PATENT DOCUMENTS

| | | |
|---|---|---|
| JP | 05-117870 | 5/1993 |
| JP | 06-346988 | 12/1994 |
| JP | 07-139665 | 5/1995 |
| JP | 08-103724 | 4/1996 |
| JP | 08-105582 | 4/1996 |
| JP | 10-245685 | 9/1998 |
| JP | 2000-096256 | 4/2000 |
| JP | 2001-335956 | 12/2001 |
| JP | 2003-231974 | 8/2003 |

* cited by examiner

SURFACE CONDITIONING PRIOR TO CHEMICAL CONVERSION TREATMENT OF A STEEL MEMBER

REFERENCE TO RELATED APPLICATIONS

This application is a continuation of International Patent Application No. PCT/JP2004/18123, filed Dec. 6, 2004. This PCT application was not in English as published under PCT Article 21(2).

TECHNICAL FIELD

This invention relates to a surface conditioning solution which is used for treating a steel member and particularly a threaded joint for steel pipes such as OCTG (oil country tubular goods or oil well pipes) prior to phosphate chemical conversion treatment, as well as to a surface treating method for a steel member and to a surface treated steel member and particularly a threaded joint for steel pipes in which the surface conditioning solution is used. By carrying out surface conditioning according to the present invention, the resistance to galling (galling resistance) of a threaded joint for steel pipes such as OCTG can be markedly improved.

BACKGROUND ART

Chemical conversion treatment of a steel member is a chemical reaction of steel with a kind of a corrosive solution to form an adherent coating of a corrosion product on the surface of the steel member. Depending on the type of the corrosive solution which is used, chemical conversion treatment includes phosphate treatment, chromate treatment, oxalate treatment, and the like. Among others, phosphate chemical conversion treatment (also called phosphate treatment or phosphating) is widely used in the automotive industry to form a substratum coating for surface preparation prior to electrodeposition coating of a steel sheet.

In a steel sheet for an automobile, phosphate chemical conversion treatment is conducted for surface preparation prior to paint coating in order to increase the adhesion of an electrodeposited paint coating. It is desired for this treatment to form a dense phosphate coating composed of fine crystal grains. In order to ensure that such a phosphate coating is formed by phosphate chemical conversion treatment, it is known that a steel sheet is subjected, prior to the treatment, to surface conditioning using a conditioning solution containing phosphate ions and alkali metal ions.

For example, JP-A 57-82478 (Document 1), JP-A 10-245685 (Document 2), and JP-A 2000-96256 (Document 3) disclose that a dense chemical conversion coating having extremely fine crystal grains can be formed by treating a steel material with a surface conditioning solution containing a mixture of "an alkali metal phosphate as a main component and a small amount of a titanium compound and a chlorate", "fine phosphate particles and an alkali metal salt, an ammonium salt, or the like", or "fine phosphate particles and an accelerator (organic compound)", respectively, followed by chemical conversion treatment with a phosphate solution (phosphating treatment).

The purpose of each of these surface conditioning techniques resides in densification and refinement of a phosphate coating which is formed by phosphating, and the surface conditioning solution itself contains both alkali metal ions and phosphate ions.

OCTG such as tubing and casing which are used when excavating oil wells are generally connected together by threaded joints. The depth of oil wells is usually 2,000-3,000 meters, but in recent years, it has sometimes reached 8,000-10,000 meters in deep oil wells for offshore oil fields and the like.

When they are placed in the environment of its use, such threaded joints connecting OCTG continue to receive the action of compound pressures including axial tensile forces resulting from the weight of the OCTG and joints themselves and internal and external surface pressures as well as underground heat. Therefore, the joints are required to maintain gas tightness and liquid tightness without breaking even in such environments. At the time of lowering tubing and casing into a well, there are cases in which a joint which has been tightened is loosened and then retightened. According to API (American Petroleum Institute), it is required that gas tightness and liquid tightness be maintained without the occurrence of galling, which is severe seizing which cannot be repaired, even when tightening (makeup) and loosening (breakout) are repeated 10 times for a joint for tubing or 3 times for a joint for casing.

A typical threaded joint for OCTG has a pin-box structure capable of forming a metal-to-metal contact seal. In such a joint, a male thread is formed on the end of an oil well pipe to form a pin, a female thread is formed on the inner surface of a threaded connecting member (a coupling) to form a box, and an unthreaded metal contact portion is provided at the end of the pin and in a corresponding position on the box. By connecting the two members, the unthreaded metal contact portions of the pin and the box contact each other and form a metal-to-metal contact seal. At the time of tightening, a liquid lubricant, which is referred to as a compound grease, containing heavy metal powder is applied in order to improve galling resistance, gas tightness, and liquid tightness. There are also threaded joints which do not need a coupling and which provide a male thread and an unthreaded metal contact portion on one end of a steel pipe to form a pin and provide a female thread and an unthreaded metal contact portion on the other end of the pipe to form a box.

The threaded portions and the unthreaded metal contact portions of a threaded joint are sometimes subjected to phosphate chemical conversion treatment and particularly manganese phosphate chemical conversion treatment, primarily with the object of improving their ability to retain the compound grease thereon and thus improving slip properties (galling resistance) and gas and liquid tightness of the joint. However, if the above-described techniques for phosphate chemical conversion treatment which was developed for surface preparation of a steel sheet for automobiles prior to paint coating and for the surface conditioning to be performed prior to phosphate treatment are applied without modification, it may not be possible to achieve the above object.

There have been a number of proposals concerning phosphate chemical conversion treatment for improving galling resistance of a threaded joint for OCTG.

For example, JP-A 5-117870 (Document 4) discloses that galling resistance and wear resistance are improved by forming surface irregularities with an average roughness of 20-60 micrometers on the surface of a joint for OCTG before the surface is subjected to phosphate chemical conversion treatment.

JP-A 2001-335956 (Document 5) discloses, following standard surface conditioning or surface roughening, performing chemical conversion treatment on the surface of a joint for OCTG of a Cr-containing steel, using a phosphate chemical conversion treating solution having a total acid number, a free acid number, and an acid ratio adjusted to be within a prescribed range. The manganese phosphate chemical conversion coating which is formed is dense with fine crystal grains.

JP-A 60-121385 (Document 6), JP-A 6-346988 (Document 7), and JP-A 7-139665 (Document 8) disclose that galling resistance of a threaded joint for OCTG made of a high chromium stainless steel having a Cr content of at least approximately 10 mass percent can be increased by "forming an Fe plated coating which may contain dispersed particles and then forming a phosphate coating", "forming a nitride layer and then forming an anti-galling coating (manganese phosphate or Zn or Sn plated coating)", or "forming a plating layer of iron or an iron alloy, and then forming a manganese phosphate chemical conversion coating", respectively.

JP-A JP-A 8-103724 (Document 9) and JP-A 8-105582 (Document 10) disclose that improvement of galling resistance is achieved by forming a manganese phosphate chemical conversion coating or a nitride layer and a manganese phosphate chemical conversion coating on the threaded portions and metal-to-metal contact seal portions of a threaded joint for steel pipes and then forming an overlying resin coating containing a solid lubricant (a solid lubricant coating).

JP-B 5-40034 (Document 11) discloses that a joint for steel pipes having excellent galling resistance, wear resistance, durability, and the like is obtained, without carrying out surface conditioning, by performing chemical conversion treatment using a manganese phosphating solution to which fluoride ions have been added, thereby forming a phosphate chemical conversion coating having coarse crystal grains (20-50 micrometers) on the surface of the threaded joint.

JP-A 2003-231974 (Document 12) discloses that a chemical conversion coating having high adhesion can be formed on a threaded joint for OCTG made of a Cr-containing steel by performing chemical conversion treatment, without performing surface conditioning, using a zinc or phosphate chemical conversion treating solution containing a prescribed amount of a potassium salt to form a phosphate chemical conversion coating containing potassium and that this chemical conversion coating is dense with fine crystal grains.

Document 1: JP-A 57-82478 (1982)
Document 2: JP-A 10-245685 (1998)
Document 3: JP-A 2000-96256 (2000)
Document 4: JP-A 5-117870 (1993)
Document 5: JP-A 2001-335956 (2001)
Document 6: JP-A 60-121385 (1985)
Document 7: JP-A 6-346988 (1994)
Document 8: JP-A 7-139665 (1995)
Document 9: JP-A 8-103724 (1996)
Document 10: JP-A 8-105582 (1996)
Document 11: JP-B 5-40034 (1993)
Document 12: JP-A 2003-231974 (2003)

DISCLOSURE OF THE INVENTION

With a crystalline coating like a phosphate chemical conversion coating, as the number of crystals per unit area which precipitate in the initial stage of reaction increases, a more dense coating having a finer crystal grain diameter can be formed in a short period of time. For this purpose it is advantageous that the particle size of a substance which serves as crystal nuclei be as small as possible.

In the automotive industry, in order to improve the external appearance after paint coating and rust preventing properties, it is desirable that the crystal grains of a phosphate coating be as small as possible and that the surface thereof be as smooth as possible. The techniques described in the above-described Documents 1-3 each involve carrying out surface conditioning so as to precipitate a large number of fine crystal nuclei in order to form a refined, dense phosphate chemical conversion coating.

A threaded joint for OCTG which is used in severe environments needs to be able to maintain an adequate gas and liquid tightness in such an environment and at the same time to provide durable galling resistance which can prevent galling even when tightening and loosening are carried out repeatedly. However, at present, it is not possible to completely prevent galling when tightening and loosening of a threaded joint are carried out repeatedly.

For example, if a threaded joint for OCTG is subjected, prior to phosphate treatment, to surface conditioning using a conditioning solution containing alkali metal ions and phosphate ions according to the techniques described in above-mentioned Documents 1-3 which were developed for use with steel sheet for automobiles, a dense phosphate coating composed of fine crystal grains can be formed on the surface of the threaded joint, as is the case with a steel sheet. However, with this phosphate coating, it is not possible to prevent galling when tightening and loosening of the threaded joint are repeatedly carried out.

In order to investigate the cause of this phenomenon, a threaded portion was cut out, and the surface and cross section of a coating thereon were observed in detail with a scanning electron microscope. As a result of this investigation, the following was discovered. (i) The crystal grain diameter of the phosphate chemical conversion coating is extremely small (primarily at most 1-2 micrometers), (ii) the surface is smooth without irregularities, and (iii) the thickness of the coating is thin and primarily 0.6-1.3 micrometers. The thin chemical conversion coating with its surface having no irregularities cannot hold an adequate amount of a lubricant (a compound grease therein). Therefore, lubrication becomes inadequate, and when mating threads slide with respect to each other under a high surface pressure, it is thought that the phosphate coating cannot withstand the mechanical pressure and peels off or wears away, thereby causing metal-to-metal contact and hence galling to occur.

In light of this fact, it was found that in order to improve galling resistance so as to prevent galling from occurring, it is advantageous that a phosphate chemical conversion coating have a large diameter of crystal grains so as to increase the surface irregularities of the coating and thus increase the amount of a compound grease which can be retained by the coating.

As disclosed in Document 4, even if the surface roughness of a threaded joint on which the coating is formed is increased by surface roughening treatment such as shot blasting, the crystal grain diameter of the phosphate chemical conversion coating itself does not increase, so its ability to retain a compound grease cannot be adequately increased, and the effect on improving galling resistance ends up being limited.

With the manganese phosphate chemical conversion treatment described in Document 5, if phosphate treatment is carried out for at least 60 minutes using a high temperature phosphating solution at 93° C. adjusted to a high acid concentration, i.e., a total acid strength of 80 points, a free acid strength of 7.6-10.0 points, and an acid ratio of 6.7-12.0, a phosphate chemical conversion coating can be formed which partially has a large coating thickness of 60 micrometers and a large crystal grain diameter. However, the thickness of the coating is nonuniform, and bare spots (portions where the base metal is exposed) and unevenness can locally occur in the coating, so improvement in galling resistance is inadequate. Moreover, such treatment at a high acid concentration and a high temperature for a long period is not suitable for industrial application. If the acid concentration is decreased and the duration of treatment is shortened, the uniformity of the resulting chemical conversion coating is increased, but the surface of the coating becomes relatively smooth, and an improvement in galling resistance is not obtained.

As disclosed in Documents 6-8, if a plating layer or a nitride layer is formed as a substratum layer for a phosphate chemical conversion coating, the galling resistance of a threaded joint for OCTG can be increased. This technique is intended to make it possible to apply phosphate chemical conversion treatment to a high Cr steel or stainless steel having a Cr content of at least 10 mass percent, on which a phosphate chemical conversion coating could not be formed in the past. However, even if such a substratum layer is formed, it may be necessary to perform surface conditioning prior to phosphate chemical conversion treatment. Forming a plating layer or a nitride layer is a costly and time-consuming operation, so even with respect to a high Cr steel or stainless steel having a Cr content of at least 10 mass percent, it is highly advantageous from an industrial standpoint to be able to perform phosphate chemical conversion treatment thereon with only surface conditioning and without performing surface preparation by undercoating such as plating or nitriding.

In the case of a carbon steel or a Cr-containing steel containing at most 10 mass percent of Cr, a phosphate chemical conversion coating can be formed thereon, without preceding surface preparation by undercoating such as plating or nitriding, by performing known surface conditioning prior to phosphate chemical conversion treatment. However, as stated earlier, the chemical conversion coating which is formed is a uniform thin coating with extremely fine crystal grains, so it cannot impart desired galling resistance to a joint for OCTG.

Documents 9-10 disclose a solid lubricant coating formed atop a phosphate chemical conversion coating, whereby application of a compound grease is made unnecessary. However, in order to form a solid lubricant coating, it is necessary to add the steps of application→high temperature baking→cooling, which unavoidably require a large investment in equipment, and the necessary man hours and costs become large, so it is difficult to carry out such a technique on an industrial scale from the standpoint of economy.

Document 11 describes that if phosphate chemical conversion treatment is carried out using a manganese phosphate chemical conversion treating solution containing fluoride ions, without preceding surface conditioning, a chemical conversion coating having coarse crystal grains measuring 20-50 micrometers can be formed, thereby providing a threaded joint for steel pipes having excellent galling resistance, wear resistance, durability, and the like. According to the results shown in the drawings in that document, the higher the concentration of fluoride ions in the solution, the more the coating thickness of the chemical conversion coating decreases. Galling resistance is maximized when the fluoride ion concentration is 1.0 grams/liter, and it abruptly decreases above and below this level of fluoride ions. Accordingly, it is predicted that the galling resistance will fluctuate with even a small change in the fluoride ion concentration in the phosphate solution.

When the present inventors performed further tests concerning that technique, the results in galling resistance (the number of times that tightening and loosening were repeated) markedly varied even when treatment was carried out under the same conditions. When observed under a microscope, the chemical conversion coatings were in fact composed by coarse crystal grains, but in portions, bare spots in which there were no manganese phosphate crystal grains were observed.

Accordingly, it is thought that when mating threads slide against each other under a high surface pressure, metal-to-metal contact occurs under mechanical pressure resulting in galling in those areas where only compound grease is present between the threads with no phosphate crystal grains therebetween. Namely, the technique disclosed in Document 11 has poor certainty and reliability. This problem seems to be caused by the fact that the manganese phosphate chemical conversion treating solution which is used contains many components including manganese phosphate and other additives, in addition to fluoride ions. It is thought that if the delicate balance among these components is good, desired coarse phosphate crystal grains are formed, but the consumption of components locally varies, bare spots develop in portions where the balance is disturbed.

The technique disclosed in Document 11 has another problem with respect to its use of highly corrosive fluoride ions. In use, the manganese phosphate solution containing fluoride ions causes corrosion of processing tanks, piping, piping joints, and the like due to fluoride ions in the solution, thereby increasing the frequency of replacement and repair of these parts. Therefore, an increase in the number of man hours and a decrease in productivity due to temporary halts in production and the like are unavoidable. If equipment is replaced by that which is resistant to fluoride ions, problems with respect to equipment are resolved, but investment costs become immense. In addition, it is troublesome to remove fluoride ions at the time of waste liquor disposal of the phosphate solution containing fluoride ions, so waste liquor disposal costs necessarily become extremely high. In addition, as the phosphate solution contains fluoride ions, it is conceivable that fluoride ions will remain in the manganese phosphate chemical conversion coating which is formed from the solution, and in such a case, corrosion by fluoride ions of the thread surface which is finished to an extremely high accuracy is accelerated, and there is concern of the accuracy of the thread surface being unable to meet API standards.

The object of the present invention is to provide a technique of phosphate chemical conversion treatment suitable for a threaded joint for steel pipes such as OCTG in which the above-described problems of the prior art are eliminated.

A more specific object of the invention is to form a phosphate chemical conversion coating which can impart galling resistance even to a threaded joint made of a high Cr steel or a stainless steel having a Cr content of at least 10 mass percent without the need of surface preparation by undercoating such as plating or nitriding and without use of components such as fluoride ions which are corrosive and make waste liquor disposal difficult, by treatment which can be carried out at a low cost and which can improve the galling resistance of a threaded joint with certainty.

In Document 12, the present inventors previously proposed that if a potassium compound such as potassium tetraborate is added to a phosphate chemical conversion treating solution, a robust phosphate chemical conversion coating which is free from bare spots or unevenness can be formed on the surface of a Cr-containing steel without preceding surface conditioning. The chemical conversion coating which was formed had fine crystal grains and was dense. In contrast, a sodium compound was not effective.

In subsequent research, it was discovered that if surface conditioning is carried out utilizing this compound prior to phosphate chemical conversion treatment which is carried out in a conventional manner, in contrast to the above-described results, a chemical conversion coating composed of coarse crystal grains is formed, thereby making it possible to attain the above-described objects and that this effect is obtained not only with potassium salts but also with salts of other alkali metals such as sodium, as a result of which the present invention was achieved.

From an aspect, the present invention resides in a surface conditioning solution for a steel member which is to be used prior to phosphate chemical conversion treatment, characterized in that it is an aqueous solution containing an alkali metal salt and not containing phosphate ions. The alkali metal salt is preferably an alkali metal tetraborate.

From another aspect, the present invention is a method of manufacturing a surface treated steel member, characterized in that a steel member is treated with the above-described surface conditioning solution before phosphate chemical conversion treatment is performed on the steel member.

The phosphate chemical conversion treatment is preferably manganese phosphate chemical conversion treatment.

The present invention also provides a surface treated steel member characterized by having a manganese phosphate chemical conversion coating which is formed by the above-described method on the surface of the steel member, the coating having an average crystal grain diameter of 10-110 micrometers.

In the present invention, the steel member is preferably a threaded joint for steel pipes such as OCTG, but the present invention can also be applied to other steel members to which a high surface pressure is applied. Although OCTG is of primary interest as a steel pipe, the present invention can also be applied to threaded joints for steel pipes other than OCTG.

According to the present invention, by surface conditioning of a steel member such as a threaded joint for steel pipes using an aqueous solution containing a single compound in the form of an alkali metal salt such as potassium tetraborate prior to phosphate chemical conversion treatment, a phosphate chemical conversion coating having coarse crystal grains (and hence being capable of good retention of compound grease) can be uniformly formed on the surface of the steel member without the occurrence of bare spots.

It is thought that surface conditioning according to the present invention causes a decrease in the number of crystals per unit area which precipitate in the initial stage of reaction in the subsequent phosphate chemical conversion treatment, thereby increasing the distance between crystals during growth thereof and the length of time until crystals contact each other, so the phosphate crystal grains are coarsened. A presumed mechanism thereof will be described below.

A surface conditioning solution according to the present invention may be an aqueous solution of a single compound, so the possibility of its effects varying locally or with the passage of time is small, and the above-described effects can be achieved stably and with certainty. In addition, since it is not necessary for the conditioning solution to contain a highly corrosive compound such as a fluoride, phosphate chemical conversion treatment can be carried out, without an increase in man hours, using existing equipment for phosphate chemical conversion treatment without modification, and using the conditioning solution according to the present invention in the surface conditioning step. Waste liquor disposal can also be performed in the same manner as in the existing process.

Moreover, the surface conditioning solution according to the present invention is also effective with respect to a high Cr steel or stainless steel having a Cr content of 10 mass percent or higher, as long as the concentration of an alkali metal salt in the solution is increased. Accordingly, it is possible to perform phosphate chemical conversion treatment on a steel member of a high Cr steel by the same method as employed for common steel, without performing surface preparation by undercoating such as nitriding or plating as is conventionally performed with respect to a high Cr steel or stainless steel.

According to the present invention, it becomes possible to perform surface conditioning and chemical conversion treatment at a low cost on a threaded joint for OCTG made from all types of steel ranging from common steel to high alloy steel by the same order of steps as employed in a conventional process which has been applied to common steel. In this manner, excellent galling resistance can be stably imparted to a threaded joint for OCTG, and as a result, the occurrence of galling during lowering operation of OCTG into an oil well can be prevented with certainty.

BEST MODE FOR CARRYING OUT THE INVENTION

Figure 1:
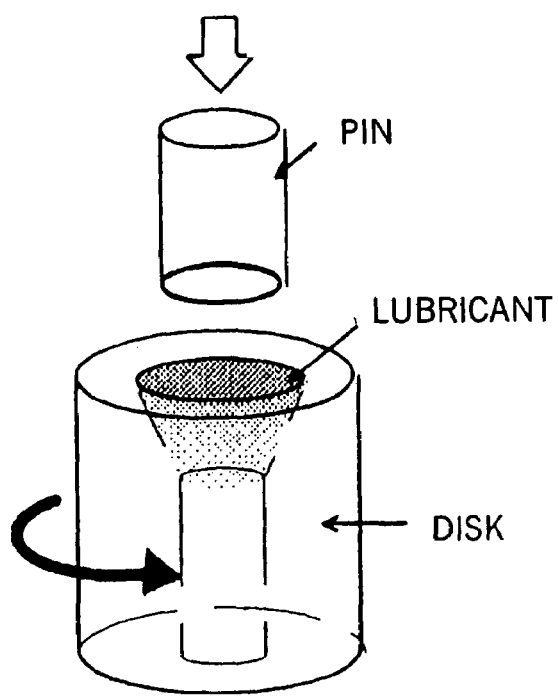
FIG. 1 is an explanatory view showing pin and disk test pieces for a friction test.

Coarsening of the crystal grains of a chemical conversion coating is particularly advantageous in the case of a phosphate chemical conversion coating applied to a threaded joint for OCTG, so below, the present invention will be explained with respect to this mode. However, as stated above, a steel member to which a surface conditioning solution according to the present invention is applied is not limited to a threaded joint for OCTG, and it may be a threaded joint for steel pipes for another use, or it may be a steel member other than a threaded joint. A threaded joint may be one which does or does not use a connecting member (a coupling).

A surface conditioning solution according to the present invention contains an alkali metal salt and does not contain phosphate ions. A borate is preferred as the alkali metal salt, and in particular a tetraborate (potassium tetraborate, sodium tetraborate, lithium tetraborate, or the like) is most preferred. Among these, potassium tetraborate is preferred. One or more alkali metal salts may be used.

Examples of alkali metal salts other than a borate which can be used include organic acid salts such as oxalates and acetates, and inorganic acid salts such as nitrates and sulfates. These can be used alone, but they are preferably used together with a borate. Below, the present invention will be described taking potassium tetraborate, which is a preferred alkali metal salt, as an example.

The mechanism by which an alkali metal salt such as potassium tetraborate which is used in a surface conditioning solution affects the formation of a phosphate chemical conversion coating is thought to be as follows.

By performing phosphate chemical conversion treatment such as manganese phosphate chemical conversion treatment on a threaded joint (a steel member) for OCTG subsequent to surface conditioning with an aqueous potassium tetraborate solution, a reaction between potassium and phosphate ions to form a potassium phosphate occurs in the interface between the steel member and the manganese phosphate chemical conversion treating solution. As a result, an excess of manganese ions (a shortage of phosphate ions) develops in the chemical conversion treating solution in the vicinity of the surface of the steel member, and suspended insoluble colloidal matter which contains potassium phosphate is formed.

The formation of this suspended matter can be actually observed in a laboratory test. For example, the present inventors immersed a test piece of an SMC 435 steel sheet (Rmax: 5 micrometers) in an aqueous potassium tetraborate solution (pH of 7.8-9.8) at room temperature for 1 minute. Subsequently they immersed the test piece in a commercially available manganese phosphate chemical conversion treating solution (at 95° C.) in a transparent glass vessel and observed the surface of the steel sheet in order to investigate the progress of a reaction between the steel sheet and the chemical conversion treating solution.

As a result, it was ascertained that as soon as the steel sheet was immersed in the chemical conversion treating solution, opaque white, feathery, colloidal matter appeared on the surface of the steel sheet. Thereafter, the surface of the steel sheet began to react with the manganese phosphate in the solution, and after several minutes, coarse crystal grains of manganese phosphate were uniformly formed on the steel surface. When the diameter of the crystal grains which were formed was measured using a SEM (scanning electron microscope) by the below-described method, it was 10 to approximately 110 micrometers.

When the cross section of the chemical conversion coating which was formed on the surface of the steel sheet was analyzed by EPMA (electron probe microanalysis), it was ascertained that potassium (and more broadly speaking an alkali metal) was present in the interface between the steel and the manganese phosphate chemical conversion coating.

From the above, it is supposed that manganese phosphate chemical conversion treatment preceded by surface conditioning using an aqueous potassium tetraborate solution according to the present invention causes the formation of suspended colloidal matter containing potassium phosphate on the surface of the steel in the initial stage of the chemical conversion treatment, the colloidal matter acting as crystal nuclei for accelerating the growth of manganese phosphate chemical conversion crystal grains, leading to the formation of a manganese phosphate chemical conversion coating having a large crystal grain diameter.

Namely, it is required to create a state of excess manganese ions due to the consumption of phosphate ions in the vicinity of the above-described interface so as to form suspended colloidal matter. Therefore, the compound which is used for surface conditioning may be another alkali metal salt other than a phosphate. When an experiment like that described above was actually carried out using sodium tetraborate and other alkali metal salts, the crystal grain diameter of the manganese phosphate chemical conversion coating which was formed did in fact become coarser, and the presence of an alkali metal was ascertained in the interface between the steel and the chemical conversion coating. If the surface conditioning solution contains phosphate ions, a state of excess manganese ions does not occur, so phosphate ions should not be included in the surface conditioning solution.

There is no particular restriction on the concentration of the surface conditioning solution, but when the alkali metal salt is potassium tetraborate, it is preferable for the concentration to be such that the pH of the conditioning solution is 7.8-9.8. If the pH of the conditioning solution is less than 7.8, the coarsening of the crystal grains of the phosphate chemical conversion coating is inadequate. On the other hand, if the pH of the conditioning solution exceeds 9.8, the effect of coarsening the crystal grains saturates. Taking chemical costs into consideration, a more preferred pH is 8.8±0.5.

When the alkali metal salt used in the surface conditioning solution is a compound other than potassium tetraborate, the range of the concentration or pH in which the effect of coarsening the crystal grains of the chemical conversion coating is adequate can be determined by experiment.

The surface conditioning solution preferably does not contain components other than potassium tetraborate (and/or other alkali metal salt), but another compound not containing phosphate ions may be included as long as it does not have a marked adverse effect on the action of the solution. Examples of other compounds which may be contained in the surface conditioning solution are alkaline earth metal salts.

For treatment of a threaded joint for OCTG with a surface conditioning solution which is an aqueous solution containing an alkali metal salt and not containing phosphate ions, the contact time between the conditioning solution and the threaded joint is not particularly limited, and it may be on the order of a few seconds. Preferably it is from approximately 10 seconds to 5 minutes and more preferably it is from 30 seconds to 1 minute. The temperature of the conditioning solution is not particularly restricted, and room temperature is sufficient.

Prior to carrying out this surface conditioning treatment, the surface of a threaded joint for OCTG is normally cleaned by degreasing and washing. There is no particular restriction on the method of contact between the surface conditioning solution and a threaded joint for OCTG, and various methods such as immersion, spraying, and showering can be used. For example, when treating the end of a steel pipe, spraying or showering is preferable to immersion. Thus, a suitable contact method can be selected in accordance with the shape of the steel member to be treated.

Subsequently, preferably without performing washing, the steel member is subjected to phosphate chemical conversion treatment such as manganese phosphate chemical conversion treatment. This phosphate chemical conversion treatment can be carried out by a conventional manner.

There is no particular restriction on the type of steel (the chemical composition of the steel) of a threaded joint for OCTG which can be treated by a surface conditioning solution according to the present invention. This conditioning solution provides a marked effect not only with respect to a threaded joint made of common steel (carbon steel) but also with respect to a threaded joint for OCTG made of a high alloy steel containing at least 10 mass percent of Cr on which it was difficult to perform chemical conversion treatment in the prior art unless surface preparation by undercoating such as nitriding or plating was carried out. In the case of common steel, an effect is obtained even when the concentration of potassium tetraborate in the surface conditioning solution is low. On the other hand, in the case of a high Cr steel containing at least 10 mass percent of Cr, in order to obtain an adequate effect, it is necessary to increase the concentration of potassium tetraborate to a certain extent. However, in the case of a threaded joint for OCTG made of such a high alloy steel, surface preparation by undercoating such as plating or nitriding which was required in the past becomes unnecessary, and galling resistance can be imparted simply by increasing the concentration of the surface conditioning solution, so the economy of the present invention is all the more striking.

The portions of a threaded joint for OCTG which are treated preferably include both the threaded portions and the unthreaded metal contact portions. However, it is also possible to treat only a part of these portions. It is possible that both a pin and a box which are normally formed on the end of OCTG and in a coupling, respectively, are subjected to surface conditioning and phosphate chemical conversion treatment, but the desired galling resistance can be adequately obtained if only one of a pin and a box is subjected to surface conditioning and phosphate chemical conversion treatment.

The surface (substrate) of the threaded joint to be treated may be in an as-machined state, but it is also possible to perform one or more types of surface preparation known from in the past, such as surface roughening by shot blasting or the like, plating (such as Fe or Fe alloy plating, or Zn plating), or nitriding. However, in the present invention, even if such surface preparation is not performed, a phosphate chemical conversion coating which can impart adequate galling resistance can be formed.

By performing phosphate chemical conversion treatment following surface conditioning according to the present invention, a uniform phosphate chemical conversion coating having coarse crystal grains and no bare spots can be formed on the surface of a threaded joint for OCTG. This chemical conversion coating can retain a large amount of compound grease therein, so it can provide a threaded joint for OCTG with excellent galling resistance such that galling does not take place even when tightening and loosening of the threaded joint for OCTG are repeated. In addition, this chemical conversion coating also imparts rust preventing properties to the joint. Among possible coatings, a manganese phosphate chemical conversion coating is particularly preferred because it has superior adhesion and hardness.

The average crystal grain diameter of the manganese phosphate chemical conversion coating is preferably at least 10 micrometers and at most 110 micrometers. This average crystal grain diameter greatly varies depending not only on the chemical conversion treatment conditions but also on the surface conditioning conditions (such as the concentration of potassium tetraborate in the conditioning solution or its pH) and the type of steel forming the threaded joint for OCTG. In general, the average crystal grain diameter of a phosphate chemical conversion coating decreases as the Cr content of a threaded joint for OCTG increases. Therefore, in the case of common steel or steel having a Cr content of at most 3 mass percent, a more preferred average crystal grain diameter is at least 20 micrometers, whereby the galling resistance is further improved. On the other hand, the average crystal grain diameter of a phosphate chemical conversion coating is generally at most 25 micrometers for a steel having a Cr content of around 5 mass percent, and it is at most 20 micrometers or even at most 15 micrometers for a steel having a Cr content of at least 10 mass percent. Even in the latter case, galling resistance is markedly improved if the average crystal grain diameter of the phosphate chemical conversion coating is at least 10 micrometers. In general, the coating thickness of the phosphate chemical conversion coating is preferably around 8-90 micrometers.

When the steel member is a threaded joint for steel pipes such as OCTG, the chemical conversion treatment is preferably manganese phosphate treatment, but depending on the type of steel member, it may be zinc phosphate treatment or a mixed manganese/zinc phosphate treatment. There is no particular restriction on the conditions for phosphate treatment, and the treatment may be performed in a conventional manner. When employing a commercially-available chemical conversion treating solution, chemical conversion treatment may be carried out under standard conditions as prescribed by the manufacturer of the solution. Since phosphate chemical conversion treatment involves precipitation of crystals, it is normally carried out by immersion. The treatment is typically carried out at 90-100° C. for a period on the order of 3-20 minutes.

A manganese phosphate chemical conversion coating formed in this manner has coarse crystal grains and hence can retain therein a large amount of a liquid lubricant such as a compound grease, thereby making it possible to greatly increase the galling resistance of a threaded joint for OCTG. When a solid lubricant coating containing a solid lubricant (such as molybdenum disulfide, tungsten disulfide, graphite, PTFE resin particles, boron nitride, or the like) in a resin coating (such as a coating of a polyamide, a polyamide-imide, or a phenolic resin) is formed instead of application of a compound grease, the coarse crystal grains of the chemical conversion coating underlying the solid lubricant coating exhibits a good anchoring effect to increase the adhesion of the solid lubricant coating, and it becomes difficult for the lubricant coating to peel off, so galling resistance is markedly improved. However, a compound grease is more advantageous than a solid lubricant coating from the standpoint of costs.

Accordingly, when either a compound grease or a solid lubricant coating is used, by performing surface conditioning according to the present invention on a threaded joint for OCTG prior to phosphate chemical conversion treatment, galling can be prevented while the threaded joint is repeatedly tightened and loosened. As a result, the existing problem of having to replace a pipe of OCTG which has undergone galling can be eliminated, and the operation of lowering OCTG into an oil well can be performed smoothly and economically.

The following examples illustrate the present invention. However, the examples in no way limit the present invention. In the examples, percent indicates mass percent unless otherwise indicated.

EXAMPLE 1

In order to verify the effects of surface conditioning according to the present invention prior to chemical conversion treatment on coarsening of the crystal grains of a manganese phosphate chemical conversion coating and on an increase in the galling resistance of a threaded joint for OCTG, a friction test as shown in FIG. 1 was carried out to determine the load at galling (the load at which galling took place).

For comparison, the same test was carried out using the surface conditioning solutions described in above-mentioned Documents 1-3 which are intended for phosphate chemical conversion treatment as pretreatment prior to paint coating of an automobile, a standard surface conditioning treatment (using a commercially-available product) performed prior to manganese phosphate chemical conversion treatment as suggested in Document 5, surface preparation by undercoating such as plating or nitriding as described in Documents 6-8, a resin coating containing a solid lubricant formed atop a manganese phosphate chemical conversion coating as described in Document 9 (in some cases surface preparation was performed), and a manganese phosphate chemical conversion treating solution to which fluoride ions were added as described in Document 11.

The surface conditioning solution used in the test was an aqueous solution containing potassium tetraborate which is an alkali metal borate and having a pH of 7.8-10.0. It should be understood that the higher the pH of the solution, the higher the concentration of potassium tetraborate therein.

As shown in FIG. 1, the test pieces which were used were pin and disk friction test pieces made of SCM435 steel. The pin had a cylindrical shape with a diameter of 20 mm and a length of 60 mm. The disk had a larger cylindrical shape with a diameter of 60 mm and a length of 70 mm. At the center of the disk was formed a bore passing through the disk in the longitudinal direction. One end surface of the bore opened so as to form a cavity of conical shape by countersinking. The pin could be inserted into the countersunk cavity. The surface roughness Rmax of the end surface of the pin and the countersunk cavity of the disk, which were portions undergoing friction, was 5 micrometers.

Each of the test pieces in the form of the pin and the disk was degreased and washed in a conventional manner. Subsequently, the surface of the conical portion (the countersunk cavity) of the disk to which a liquid lubricant (a compound grease) was to be applied was subjected to surface conditioning and manganese phosphate chemical conversion treatment. The pin was only degreased and washed.

The surface conditioning treatment was carried out by immersing the disk in the surface conditioning solution being tested at room temperature for 1 minute. Subsequently, without washing the test piece, conventional manganese phosphate chemical conversion treatment was carried out using a commercially-available manganese phosphate chemical conversion treating solution as prescribed by the manufacturer to form a manganese phosphate chemical conversion coating on the surface of the countersunk cavity.

Figure 2:
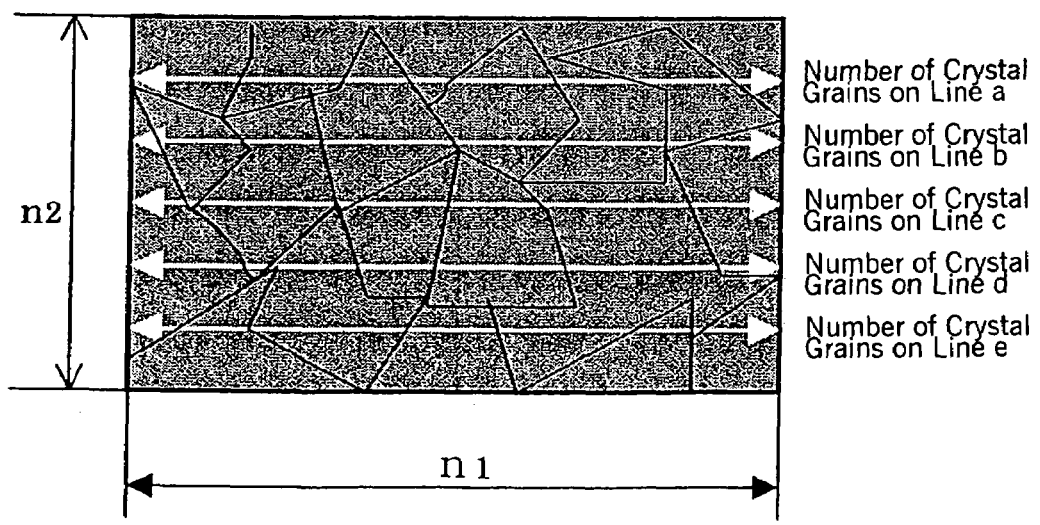
FIG. 2 is an explanatory view showing a method of determining the average crystal grain diameter of a phosphate chemical conversion coating.

The average crystal grain diameter of the manganese phosphate chemical conversion coating which was formed was determined by the method shown in FIG. 2 on an SEM image of a manganese phosphate chemical conversion coating which was formed on the surface of a SCM435 steel sheet (having the same surface roughness) under the same surface conditioning conditions and the same chemical conversion treatment conditions. The standard field of view for measurement was n1=600 micrometers and n2=452 micrometers. The average crystal grain diameter (micrometers) was calculated as 5n1/(a+b+c+d+e). In this formula, a-e are the number of crystal grains observed on lines a-e, respectively, in FIG. 2. The presence or absence of bare spots and unevenness in the chemical conversion coating which was formed on the surface of the steel sheet were determined by visual observation.

For comparison, treatment of the test pieces was carried out by conventional methods in accordance with the treatment conditions disclosed in each of the above-described documents. However, the type of phosphate chemical conversion treatment was in each case manganese phosphate chemical conversion treatment using the same chemical conversion treating solution as in the above-described example.

A friction test was carried out using a pin and disk treated as described above. First, a compound grease, which was a liquid lubricant used at the time of fastening OCTG by a threaded joint, was applied to the countersunk cavity of the disk on which a manganese phosphate chemical conversion coating was formed. The friction test was carried out by inserting the pin into the countersunk cavity of the disk to which compound grease had been applied, and while applying a predetermined load to the pin, the disk was rotated for 30 seconds (at a rotational speed of 20 rpm). The load was 1,000 kgf at the start of testing and then it was increased by increments of 100 kgf. The friction test was repeated until galling occurred in the region of contact between the pin and the disk, whereby the load at galling was determined for evaluation of galling resistance. A load at galling of 5 tons (5,000 kgf) is thought to be sufficient for practical use. Therefore, when the load reached 5 tons without occurrence of galling, the test was terminated.

Galling resistance was determined to be satisfactory (marked ○) if the load at galling was at least 4 tons (4,000 kgf) and was unacceptable (marked X) when it was less than 4 tons.

The test results for galling resistance and the measured values of the average crystal grain diameter of the manganese phosphate chemical conversion coating are shown in Table 1.

TABLE 1

| | Surface conditioning prior to manganese phosphate chemical conversion treatment | | Crystal grains of CC coating* | | Load at galling (ton) | Evaluation |
|---|---|---|---|---|---|---|
| | Type | pH | Size (μm) | **BS/UE | | |
| Compar. | no surface conditioning | | 6 | None | 3.7 | X |
| Inventive | potassium tetraborate | 7.8 | 11 | None | 4.3 | ○ |
| | | 8.0 | 26 | None | 5.0 | ○ |
| | | 8.2 | 38 | None | 5.0 | ○ |
| | | 8.4 | 50 | None | 5.0 | ○ |
| | | 8.6 | 62 | None | 5.0 | ○ |
| | | 8.8 | 68 | None | 5.0 | ○ |
| | | 9.0 | 77 | None | 5.0 | ○ |
| | | 9.2 | 85 | None | 5.0 | ○ |
| | | 9.4 | 93 | None | 5.0 | ○ |
| | | 9.6 | 98 | None | 5.0 | ○ |
| | | 9.8 | 102 | None | 5.0 | ○ |
| | | 10.0 | 101 | None | 5.0 | ○ |
| Conv. A | alkali metal phosphate + Ti + chlorate | | 6 | None | 1.7 | X |
| Conv. B | alkali metal phosphate + oxide particles (pH: 9.0) | | 1 | None | <1.0 | X |
| Conv. C | alkali metal salt + monosaccharide | | 2 | None | <1.0 | X |
| Conv. D | alkali metal salt + polysaccharide | | 1 | None | <1.0 | X |
| Conv. E | standard surface conditioning solution → (conc. manganese phosphating solution) | | 76 | Found | 3.8 | X |
| Conv. F | iron plating | | 13 | Found | 2.8 | X |
| Conv. G | nitriding → titanium colloid-based surface conditioning | | 16 | None | 2.8 | X |
| Conv. H | iron plating → manganese colloid-based surface conditioning | | 12 | None | 2.2 | X |
| Conv. I | solid lubricant coating on manganese phosphate coating | | 10 | None | 3.8 | X |
| Conv. J | iron plating → solid lubricant coating on manganese phosphate coating | | 12 | None | 3.8 | X |

TABLE 1-continued

| | Surface conditioning prior to manganese phosphate chemical conversion treatment | | Crystal grains of CC coating* | | Load at galling | |
|---|---|---|---|---|---|---|
| | Type | pH | Size (μm) | **BS/UE | (ton) | Evaluation |
| Conv. K | no surface conditioning/managenese phosphate chemical conversion treatment containing fluoride ions (three test pieces prepared under the same conditions) | | 23 | Found | 2.9 | X |
| | | | 36 | None | 4.4 | ○ |
| | | | 42 | Found | 3.2 | X |
| Conv. A (Compar. 1) | alkali metal phosphate + Ti | | 8 | Found | 1.3 | X |
| Conv. L | surface roughening   Ra = 20 μm | | 9 | None | 2.0 | X |
| | by sand blasting   Ra = 60 μm | | 9 | None | 2.5 | X |
| Conv. M | no surface conditioning/potassium tetraborate added to manganese phosphate chemical conversion treatment solution | | 5 | None | 3.9 | X |

*CC coating = chemical conversion coating;
**BS/UE = bare spots/unevenness
compar. = comparative example;
conv. = conventional method As shown in Table 1, when manganese phosphate chemical conversion treatment was carried out after degreasing and washing without surface conditioning, the average crystal grain diameter of the chemical conversion coating was 6 micrometers. By carrying out surface conditioning prior to chemical conversion treatment according to the present invention, the crystal grain diameter of the manganese phosphate chemical conversion coating could be increased to the range of 10-110 micrometers. There was a tendency for the crystal grain diameter to increase as the pH of the surface conditioning solution increased, i.e., as the concentration of potassium tetraborate therein increased. Galling resistance was good in each case, and particularly when the average crystal grain diameter exceeded 20 micrometers, the galling resistance was further improved as indicated by the load at galling which reached 5 tons.

In contrast, in the comparative examples in which surface conditioning and/or chemical conversion treatment was carried out according to conventional techniques, the load at galling was less than 4 tons, so the galling resistance was inadequate (marked X) with the exception of one example.

More specifically, in conventional methods A-D corresponding to the methods described in above-mentioned Documents 1-3, since these are techniques intended to refine phosphate crystal grains, the average crystal grain diameter was naturally small, and the load at galling was less than 2 tons indicating that the galling resistance was extremely inferior.

However, even with conventional methods E-K which were techniques intended for coarsening the crystal grains, in spite of the fact that the crystal grains were in fact coarsened as indicated by the average crystal grain diameter which was at least 10 micrometers, the load at galling was less than 4 tons, except for one example of conventional method K. The cause thereof is thought to be that particularly in a chemical conversion coating in which the average crystal grain diameter exceeds 20 micrometers, bare spots and unevenness of the coating were observed indicating that the coating was uneven. The reason why galling resistance was inferior even with a chemical conversion coating in which bare spots and unevenness were not observed is unclear, but reasons such as the adhesion of the chemical conversion coating being poor are conceivable. For conventional method K, when treatment was repeated three times under the same conditions to prepare three test pieces, a uniform chemical conversion coating with no bare spots or unevenness was formed on only one test piece, which exhibited good galling resistance, but for the remaining two pieces, even though the average crystal grain diameter was large, the galling resistance was inferior due to the occurrence of bare spots and unevenness. Thus, conventional method K had unstable results, and it could not form a phosphate chemical conversion coating having excellent galling resistance with certainty.

Galling resistance was also not improved with conventional method L in which surface roughening was performed by sand blasting of the substrate steel. Conventional method M used the same potassium tetraborate as in the present invention, but it was added to a manganese phosphate chemical conversion treating solution with which chemical conversion treatment was performed. Also in this method, the effect of coarsening phosphate chemical conversion treatment crystal grains and of increasing the load at galling was not obtained. Namely, the effect of improving galling resistance attained by the present invention is obtainable only when carrying out surface conditioning using potassium tetraborate, and this compound is not effective when used at the time of phosphate chemical conversion treatment.

EXAMPLE 2

In this example, a threaded joint for OCTG made of API J55 steel (carbon steel) was subjected to surface conditioning according to the present invention and to subsequent manganese phosphate chemical conversion treatment, and after application of a compound grease, the joint was tightened and loosened repeatedly to evaluate galling resistance. An aqueous potassium tetraborate solution and an aqueous sodium tetraborate solution were used as surface conditioning solutions.

The threaded joint for OCTG used in the test had a pin-box structure capable of forming a metal-to-metal contact seal. The box constituting the joint had an internally threaded portion and an unthreaded metal contact portion both with a surface roughness (Rmax) of 5 micrometers formed on the inner surface of a coupling having an inner diameter of 7 inches (178 mm) and a wall thickness of 0.408 inches (10.4 mm). The pin constituting the joint had an externally threaded portion and an unthreaded metal contact portion formed on the end of a steel pipe having an outer diameter of 7 inches and a wall thickness of 0.408 inches. Surface conditioning and chemical conversion treatment were performed only on the box (namely, on the inner surface of the coupling), while the pin (the end of the steel pipe) was left untreated (only degreasing and washing were performed thereon).

After the box was subjected to degreasing with an alkali degreasing solution and then washed in a conventional manner, surface conditioning thereof was carried out by immersing the box in an aqueous solution of potassium tetraborate or sodium tetraborate having a pH of 7.8-10.0 at room temperature for 1 minute. Thereafter, the box was directly immersed for 10 minutes in a commercially-available manganese phosphate chemical conversion treating solution (at 95° C.) to form a manganese phosphate chemical conversion coating.

In the same manner as described in Example 1, the average crystal grain diameter and the presence or absence of bare spots and unevenness of the manganese phosphate chemical conversion coating which was formed were determined by SEM and visual observation, respectively, of a manganese phosphate chemical conversion coating which was formed on the surface of a steel sheet of the same type of steel under the same conditions for surface conditioning and chemical conversion treatment.

A makeup test of a threaded joint for OCTG was carried out using the box which had been subjected to manganese phosphate chemical conversion treatment as described above and an untreated pin. Prior to tightening, a given amount of a commercially-available compound grease was applied to the surface of the box as a lubricant. In the makeup test, tightening which was performed at a speed of 10 rpm to a maximum torque specified by API of 16,740 N·m and loosening which was performed at the same speed were repeated until galling occurred and tightening or loosening was no longer possible. Galling resistance was evaluated based on the number of times tightening was performed (number of tightenings) until the occurrence of galling. Galling resistance was determined to be good (marked ○) if tightening was performed at least 10 times until the occurrence of galling, fair (marked Δ) if it was performed 5-9 times, and poor (marked X) if it was performed at most 4 times. A value of 1 (one) for the number of tightenings means that galling occurred at the time of the first tightening or loosening. The results are compiled in Table 2.

As can be seen from Table 2, in the case of a carbon steel, when manganese phosphate chemical conversion treatment was carried out without preceding surface conditioning, the average crystal grain diameter of the chemical conversion coating was 9 micrometers, and bare spots and unevenness were found in the coating. The number of tightenings until the occurrence of galling was 3, so the results of galling resistance was marked X (poor).

In contrast, by carrying out surface conditioning with an aqueous solution of potassium tetraborate or sodium tetraborate having a pH of at least 7.8 according to the present invention prior to manganese phosphate chemical conversion treatment, a chemical conversion coating having coarsened crystal grains with an average crystal grain diameter of at least 10 micrometers was formed. As a result, the number of tightenings until the occurrence of galling was increased to 13-25 indicating that galling resistance was enormously improved. As can be seen from Table 2, the effect of this surface conditioning on improving galling resistance increased (i.e., the number of tightenings until the occurrence of galling increased) as the pH of the surface conditioning solution increased, but the effect saturated at a pH of 9.8, and the same effect was obtained when the surface conditioning solution was an aqueous sodium tetraborate solution as when it was a potassium tetraborate solution.

EXAMPLE 3

In this example, a threaded joint for OCTG made of API C-110 steel (1Cr-0.7Mo steel) was subjected to surface conditioning according to the present invention and subsequent manganese phosphate chemical conversion treatment, and galling resistance was evaluated, after application of a compound grease, by repeated tightening and loosening. An aqueous potassium tetraborate solution and an aqueous sodium tetraborate solution were used as surface conditioning solutions.

The shape of the threaded joint for OCTG used in the test, the methods of surface conditioning and chemical conversion

TABLE 2

| | Threaded joint for OCTG made of J55 steel (carbon steel) | | | | | | | |
|---|---|---|---|---|---|---|---|---|
| | Surface conditioning with aqueous potassium tetraborate solution | | | | Surface conditioning with aqueous sodium tetraborate solution | | | |
| | | CC coating* | | Galling | | CC coating* | | Galling |
| Category | pH of conditioning solution | Ave. grain diam. (μm) | **BS/UE | resistance Number of tightenings (evaluation) | pH of conditioning solution | Ave. grain diam. (μm) | **BS/UE | resistance Number of tightenings (evaluation) |
| Compar | Untreated | 9 | Found | 3 (X) | Untreated | 9 | Found | 3 (X) |
| Inventive | 7.8 | 15 | None | 13 (○) | 7.8 | 13 | None | 14 (○) |
| | 8.0 | 35 | " | 14 (○) | 8.0 | 32 | " | 14 (○) |
| | 8.2 | 45 | " | 14 (○) | 8.2 | 43 | " | 14 (○) |
| | 8.4 | 60 | " | 15 (○) | 8.4 | 57 | " | 14 (○) |
| | 8.6 | 70 | " | 18 (○) | 8.6 | 68 | " | 17 (○) |
| | 8.8 | 76 | " | 21 (○) | 8.8 | 76 | " | 21 (○) |
| | 9.0 | 80 | " | 21 (○) | 9.0 | 77 | " | 21 (○) |
| | 9.2 | 85 | " | 22 (○) | 9.2 | 82 | " | 21 (○) |
| | 9.4 | 95 | " | 23 (○) | 9.4 | 89 | " | 23 (○) |
| | 9.6 | 98 | " | 24 (○) | 9.6 | 96 | " | 23 (○) |
| | 9.8 | 105 | " | 25 (○) | 9.8 | 100 | " | 24 (○) |
| | 10.0 | 110 | " | 25 (○) | 10.0 | 108 | " | 25 (○) |

*CC coating = chemical conversion coating;
**BS/UE = bare spots/unevenness treatment, the makeup test and the method of its evaluation were the same as for Example 2. The test results are shown in Table 3.

of galling increased) as the pH of the surface conditioning solution increased, but the effect saturated at a pH of 9.8, and the same effect was obtained when the surface conditioning solution was an aqueous sodium tetraborate solution as when it was a potassium tetraborate solution.

TABLE 3

Threaded joint for OCTG made of C-110 steel (1Cr—0.7Mo steel)

| | Surface conditioning with aqueous potassium tetraborate solution | | | | Surface conditioning with aqueous sodium tetraborate solution | | | |
|---|---|---|---|---|---|---|---|---|
| | | CC coating* | | Galling | | CC coating* | | Galling |
| Category | pH of conditioning solution | Ave. grain diam. (μm) | **BS/UE | resistance Number of tightenings (evaluation) | pH of conditioning solution | Ave. grain diam. (μm) | **BS/UE | resistance Number of tightenings (evaluation) |
| Compar | Untreated | 8 | Found | 2 (X) | Untreated | 8 | Found | 2 (X) |
| Inventive | 7.8 | 14 | None | 13 (○) | 7.8 | 13 | None | 13 (○) |
| | 8.0 | 30 | " | 13 (○) | 8.0 | 28 | " | 13 (○) |
| | 8.2 | 35 | " | 13 (○) | 8.2 | 34 | " | 14 (○) |
| | 8.4 | 45 | " | 15 (○) | 8.4 | 44 | " | 15 (○) |
| | 8.6 | 50 | " | 17 (○) | 8.6 | 52 | " | 17 (○) |
| | 8.8 | 70 | " | 20 (○) | 8.8 | 72 | " | 18 (○) |
| | 9.0 | 75 | " | 21 (○) | 9.0 | 72 | " | 18 (○) |
| | 9.2 | 78 | " | 22 (○) | 9.2 | 73 | " | 20 (○) |
| | 9.4 | 88 | " | 22 (○) | 9.4 | 85 | " | 21 (○) |
| | 9.6 | 95 | " | 23 (○) | 9.6 | 90 | " | 21 (○) |
| | 9.8 | 99 | " | 25 (○) | 9.8 | 96 | " | 23 (○) |
| | 10.0 | 102 | " | 25 (○) | 10.0 | 102 | " | 23 (○) |

*CC coating = chemical conversion coating;
**BS/UE = bare spots/unevenness

As can be seen from Table 3, in the case of a 1Cr-0.7Mo steel, when manganese phosphate chemical conversion treatment was carried out without preceding surface conditioning, the average crystal grain diameter of the chemical conversion coating was 8 micrometers, which was even smaller than for a carbon steel, and there were bare spots and unevenness in the coating. The number of tightenings until the occurrence of galling was 2, so the galling resistance was marked X (poor).

In contrast, by carrying out surface conditioning with an aqueous solution of potassium tetraborate or sodium tetraborate having a pH of at least 7.8 according to the present invention prior to manganese phosphate chemical conversion treatment, a chemical conversion coating having coarsened crystal grains with an average crystal grain diameter of at least 10 micrometers was formed. As a result, the number of tightenings until the occurrence of galling was increased to 13-25 indicating that galling resistance was enormously improved. As can be seen from Table 3, the effect of this surface conditioning on improving galling resistance increased (i.e., the number of tightenings until the occurrence

EXAMPLE 4

In this example, a threaded joint for OCTG made of a 3Cr steel was subjected to surface conditioning according to the present invention and subsequent manganese phosphate chemical conversion treatment, and galling resistance was evaluated, after application of a compound grease, by repeated tightening and loosening. An aqueous potassium tetraborate solution and an aqueous sodium tetraborate solution were used as surface conditioning solutions.

The shape of the threaded joint for OCTG used in this test, the methods of surface conditioning and chemical conversion treatment, and the makeup test and the method of its evaluation were the same as in Example 2. The test results are shown in Table 4.

TABLE 4

Threaded joint for OCTG made of 3Cr steel

| | Surface conditioning with aqueous potassium tetraborate solution | | | | Surface conditioning with aqueous sodium tetraborate solution | | | |
|---|---|---|---|---|---|---|---|---|
| | | CC coating* | | Galling | | CC coating* | | Galling |
| Category | pH of conditioning solution | Ave. grain diam. (μm) | **BS/UE | resistance Number of tightenings (evaluation) | pH of conditioning solution | Ave. grain diam. (μm) | **BS/UE | resistance Number of tightenings (evaluation) |
| Compar | Untreated | 8 | Found | 4 (X) | Untreated | 8 | Found | 4 (X) |
| Inventive | 7.8 | 12 | None | 10 (○) | 7.8 | 12 | None | 10 (○) |
| | 8.0 | 20 | " | 10 (○) | 8.0 | 19 | " | 10 (○) |

TABLE 4-continued

Threaded joint for OCTG made of 3Cr steel

| Category | Surface conditioning with aqueous potassium tetraborate solution | | | | Surface conditioning with aqueous sodium tetraborate solution | | | |
|---|---|---|---|---|---|---|---|---|
| | pH of conditioning solution | CC coating* Ave. grain diam. (μm) | **BS/UE | Galling resistance Number of tightenings (evaluation) | pH of conditioning solution | CC coating* Ave. grain diam. (μm) | **BS/UE | Galling resistance Number of tightenings (evaluation) |
| | 8.2 | 28 | " | 13 (○) | 8.2 | 27 | " | 12 (○) |
| | 8.4 | 36 | " | 14 (○) | 8.4 | 33 | " | 13 (○) |
| | 8.6 | 41 | " | 15 (○) | 8.6 | 39 | " | 13 (○) |
| | 8.8 | 48 | " | 18 (○) | 8.8 | 45 | " | 17 (○) |
| | 9.0 | 50 | " | 19 (○) | 9.0 | 48 | " | 18 (○) |
| | 9.2 | 50 | " | 20 (○) | 9.2 | 49 | " | 18 (○) |
| | 9.4 | 52 | " | 20 (○) | 9.4 | 50 | " | 19 (○) |
| | 9.6 | 68 | " | 20 (○) | 9.6 | 59 | " | 20 (○) |
| | 9.8 | 80 | " | 21 (○) | 9.8 | 75 | " | 20 (○) |
| | 10.0 | 92 | " | 21 (○) | 10.0 | 89 | " | 20 (○) |

**CC coating = chemical conversion coating;
**BS/UE = bare spots/unevenness

As can be seen from Table 4, in the case of a 3Cr steel, when manganese phosphate chemical conversion treatment was carried out without preceding surface conditioning, the average crystal grain diameter of the chemical conversion coating was 8 micrometers, and there were bare spots and unevenness in the coating. The number of tightenings until the occurrence of galling was 4, so the galling resistance was marked X (poor).

In contrast, by carrying out surface conditioning with an aqueous solution of potassium tetraborate or sodium tetraborate having a pH of at least 7.8 according to the present invention prior to manganese phosphate chemical conversion treatment, a chemical conversion coating having coarsened crystal grains with an average crystal grain diameter of at least 10 micrometers was formed. As a result, the number of tightenings until the occurrence of galling was increased to 10-21 indicating that galling resistance was enormously improved. As can be seen from Table 4, the effect of this surface conditioning on improving galling resistance increased (i.e., the number of tightenings until the occurrence of galling increased) as the pH of the surface conditioning solution increased, but the effect saturated at a pH of 9.8, and the same effect was obtained when the surface conditioning solution was an aqueous sodium tetraborate solution as when it was a potassium tetraborate solution.

EXAMPLE 5

In this example, a threaded joint for OCTG made of a 5Cr steel was subjected to surface conditioning according to the present invention and subsequent manganese phosphate chemical conversion treatment, and galling resistance was evaluated, after application of a compound grease, by repeated tightening and loosening. An aqueous potassium tetraborate solution and an aqueous sodium tetraborate solution were used as surface conditioning solutions.

The shape of the threaded joint for OCTG used in the test, the methods for surface conditioning and chemical conversion treatment, and the makeup test and the method of its evaluation were the same as for Example 2. The test results are shown in Table 5.

TABLE 5

Threaded joint for OCTG made of 5Cr steel

| Category | Surface conditioning with aqueous potassium tetraborate solution | | | | Surface conditioning with aqueous sodium tetraborate solution | | | |
|---|---|---|---|---|---|---|---|---|
| | pH of conditioning solution | CC coating* Ave. grain diam. (μm) | **BS/UE | Galling resistance Number of tightenings (evaluation) | pH of conditioning solution | CC coating* Ave. grain diam. (μm) | **BS/UE | Galling resistance Number of tightenings (evaluation) |
| Compar | Untreated | 3 | Found | 1 (X) | Untreated | 3 | Found | 1 (X) |
| Inventive | 7.8 | 10 | None | 10 (○) | 7.8 | 10 | None | 10 (○) |
| | 8.0 | 13 | " | 10 (○) | 8.0 | 11 | " | 10 (○) |
| | 8.2 | 13 | " | 11 (○) | 8.2 | 12 | " | 10 (○) |
| | 8.4 | 14 | " | 11 (○) | 8.4 | 13 | " | 11 (○) |
| | 8.6 | 14 | " | 11 (○) | 8.6 | 13 | " | 10 (○) |
| | 8.8 | 19 | " | 12 (○) | 8.8 | 17 | " | 11 (○) |
| | 9.0 | 20 | " | 12 (○) | 9.0 | 18 | " | 11 (○) |
| | 9.2 | 20 | " | 13 (○) | 9.2 | 18 | " | 11 (○) |

TABLE 5-continued

Threaded joint for OCTG made of 5Cr steel

| | Surface conditioning with aqueous potassium tetraborate solution | | | | Surface conditioning with aqueous sodium tetraborate solution | | | |
|---|---|---|---|---|---|---|---|---|
| | | CC coating* | | Galling | | CC coating* | | Galling |
| Category | pH of conditioning solution | Ave. grain diam. (μm) | **BS/UE | resistance Number of tightenings (evaluation) | pH of conditioning solution | Ave. grain diam. (μm) | **BS/UE | resistance Number of tightenings (evaluation) |
| | 9.4 | 20 | " | 13 (○) | 9.4 | 20 | " | 12 (○) |
| | 9.6 | 21 | " | 13 (○) | 9.6 | 20 | " | 13 (○) |
| | 9.8 | 21 | " | 14 (○) | 9.8 | 20 | " | 13 (○) |
| | 10.0 | 21 | " | 14 (○) | 10.0 | 21 | " | 14 (○) |

**CC coating = chemical conversion coating;
**BS/UE = bare spots/unevenness

As can be seen from Table 5, in the case of a 5Cr steel, when manganese phosphate chemical conversion treatment was carried out without preceding surface conditioning, the average crystal grain diameter of the chemical conversion coating was an extremely small value of 3 micrometers, and there were bare spots and unevenness in the coating. The number of tightenings until the occurrence of galling was 1, so the galling resistance was marked X (poor). Thus, when the Cr content is 5% or above, there is a large decrease in galling resistance.

In contrast, by carrying out surface conditioning with an aqueous solution of potassium tetraborate or sodium tetraborate having a pH of at least 7.8 according to the present invention prior to manganese phosphate chemical conversion treatment, a chemical conversion coating having coarsened crystal grains with an average crystal grain diameter of at least 10 micrometers was formed. As a result, the number of tightenings until the occurrence of galling was increased to 10-14 indicating that galling resistance was enormously improved. As can be seen from Table 5, the effect of this surface conditioning on improving galling resistance increased (i.e., the number of tightenings until the occurrence of galling increased) as the pH of the surface conditioning solution increased, but the effect saturated at a pH of 9.8, and the same effect was obtained when the surface conditioning solution was an aqueous sodium tetraborate solution as when it was a potassium tetraborate solution.

EXAMPLE 6

In this example, a threaded joint for OCTG made of a 13Cr steel was subjected to surface conditioning according to the present invention and subsequent manganese phosphate chemical conversion treatment, and galling resistance was evaluated, after application of a compound grease, by repeated tightening and loosening. An aqueous potassium tetraborate solution and an aqueous sodium tetraborate solution were used as surface conditioning solutions.

The shape of the threaded joint for OCTG used in the test, the methods of surface conditioning and chemical conversion treatment, and the makeup test and the method of its evaluation were the same as in Example 2. The test results are shown in Table 6.

TABLE 6

Threaded joint for OCTG made of 13Cr steel

| | Surface conditioning with aqueous potassium tetraborate solution | | | | Surface conditioning with aqueous sodium tetraborate solution | | | |
|---|---|---|---|---|---|---|---|---|
| | | CC coating* | | Galling | | CC coating* | | Galling |
| Category | pH of conditioning solution | Ave. grain diam. (μm) | **BS/UE | resistance Number of tightenings (evaluation) | pH of conditioning solution | Ave. grain diam. (μm) | **BS/UE | resistance Number of tightenings (evaluation) |
| Compar | Untreated | 0 | | 1 (X) | Untreated | 0 | | 1 (X) |
| Inventive | 7.8 | 0 | | 1 (X) | 7.8 | 0 | | 1 (X) |
| | 8.0 | 0 | | 1 (X) | 8.0 | 0 | | 1 (X) |
| | 8.2 | 1 | Found | 1 (X) | 8.2 | 0 | | 1 (X) |
| | 8.4 | 1 | Found | 1 (X) | 8.4 | 1 | Found | 1 (X) |
| | 8.6 | 3 | None | 2 (X) | 8.6 | 3 | None | 2 (X) |
| | 8.8 | 4 | " | 4 (X) | 8.8 | 3 | " | 3 (X) |
| | 9.0 | 8 | " | 7 (Δ) | 9.0 | 7 | " | 7 (Δ) |
| | 9.2 | 13 | " | 10 (○) | 9.2 | 9 | " | 9 (Δ) |
| | 9.4 | 15 | " | 10 (○) | 9.4 | 13 | " | 10 (○) |
| | 9.6 | 15 | " | 11 (○) | 9.6 | 13 | " | 11 (○) |
| | 9.8 | 15 | " | 11 (○) | 9.8 | 14 | " | 11 (○) |
| | 10.0 | 15 | " | 11 (○) | 10.0 | 14 | " | 11 (○) |

**CC coating = chemical conversion coating;
**BS/UE = bare spots/unevenness

As can be seen from Table 6, in the case of a 13Cr steel, when manganese phosphate chemical conversion treatment was performed without preceding surface conditioning, there was essentially no formation of chemical conversion crystals, and galling occurred upon a single tightening, so the galling resistance was marked X (poor). Thus, with a steel having a Cr content exceeding 10%, galling resistance further markedly decreased.

In contrast, by carrying out surface conditioning with an aqueous solution of potassium tetraborate or sodium tetraborate having a pH of at least 7.8 according to the present invention prior to manganese phosphate chemical conversion treatment, a chemical conversion coating could be formed having coarsened crystal grains with an average crystal grain diameter of at least 10 micrometers. However, in the case of a steel having a Cr content exceeding 10%, in order to make the average crystal grain diameter of the chemical conversion coating 10 micrometers or greater, it was necessary to give the surface conditioning solution a high concentration (a high pH). In this example, when the pH of an aqueous solution exceeded 9.0 for potassium tetraborate or 9.2 for sodium tetraborate, the average crystal grain diameter of the chemical conversion coating became at least 10 micrometers. When the borate solution had a pH of 8.6 or higher, it became possible to form a chemical conversion coating without bare spots or unevenness, and particularly when it had a pH of 9.0 or higher, it was possible to form a chemical conversion coating with an average crystal grain diameter of at least 5 micrometers.

Galling resistance increased as the average crystal grain diameter of the chemical conversion coating increased. When surface conditioning was not performed, the number of tightenings was 1. When the average crystal grain diameter of the chemical conversion coating became at least 5 micrometers as a result of surface conditioning according to the present invention, the number of tightenings increased to at least 5, whereby galling resistance was improved to the mark Δ. When the average crystal grain diameter became 10 micrometers or greater, the number of tightenings became at least 10, whereby galling resistance further improved to the mark ○.

Namely, according to the present invention, even with a threaded joint for OCTG made of a steel having a Cr content of greater than 10% which is highly susceptible to galling as can be evidenced from the comparative example in which the number of tightenings was 1, the striking effect is obtained that 10 or more tightenings and loosenings become possible.

EXAMPLE 7

In this example, a threaded joint for OCTG made of a 25Cr steel was subjected to surface conditioning according to the present invention and subsequent manganese phosphate chemical conversion treatment, and galling resistance was evaluated, after application of a compound grease, by repeated tightening and loosening. An aqueous potassium tetraborate solution and an aqueous sodium tetraborate solution were used as surface conditioning solutions.

The shape of the threaded joint for OCTG used in the test, the methods of surface conditioning and chemical conversion treatment, and the makeup test and the method of its evaluation were the same as in Example 2. The test results are shown in Table 7.

TABLE 7

Threaded joint for OCTG made of 25Cr steel

| | Surface conditioning with aqueous potassium tetraborate solution | | | | Surface conditioning with aqueous sodium tetraborate solution | | | |
|---|---|---|---|---|---|---|---|---|
| | | CC coating* | | Galling | | CC coating* | | Galling |
| Category | pH of conditioning solution | Ave. grain diam. (μm) | **BS/UE | resistance Number of tightenings (evaluation) | pH of conditioning solution | Ave. grain diam. (μm) | **BS/UE | resistance Number of tightenings (evaluation) |
| Compar | Untreated | 0 | | 1 (X) | Untreated | 0 | | 1 (X) |
| Inventive | 7.8 | 0 | | 1 (X) | 7.8 | 0 | | 1 (X) |
| | 8.0 | 0 | | 1 (X) | 8.0 | 0 | | 1 (X) |
| | 8.2 | 0 | | 1 (X) | 8.2 | 0 | | 1 (X) |
| | 8.4 | 0 | | 1 (X) | 8.4 | 0 | | 1 (X) |
| | 8.6 | 0 | | 1 (X) | 8.6 | 0 | | 1 (X) |
| | 8.8 | 4 | Found | 1 (X) | 8.8 | 0 | | 1 (X) |
| | 9.0 | 6 | None | 3 (X) | 9.0 | 5 | Found | 2 (X) |
| | 9.2 | 9 | " | 9 (Δ) | 9.2 | 7 | None | 8 (Δ) |
| | 9.4 | 12 | " | 10 (○) | 9.4 | 9 | " | 8 (Δ) |
| | 9.6 | 13 | " | 11 (○) | 9.6 | 10 | " | 10 (○) |
| | 9.8 | 13 | " | 11 (○) | 9.8 | 12 | " | 11 (○) |
| | 10.0 | 14 | " | 11 (○) | 10.0 | 12 | " | 11 (○) |

**CC coating = chemical conversion coating;
**BS/UE = bare spots/unevenness

As can be seen from Table 7, in the case of a 25Cr steel, when manganese phosphate chemical conversion treatment was carried out without preceding surface conditioning, substantially no chemical conversion treatment crystals were formed, and galling occurred upon one tightening, so galling resistance was marked X (poor).

In contrast, in accordance with the present invention, by performing surface conditioning using an aqueous solution of potassium tetraborate or sodium tetraborate prior to manganese phosphate chemical conversion treatment, it became possible to form a chemical conversion coating having coarsened crystal grains with an average crystal grain diameter of at least 10 micrometers. However, in the same manner as in Example 6, in the case of a steel with a Cr content exceeding 10%, it was necessary to give the surface conditioning solution a high concentration (a high pH) in order to make the average crystal grain diameter of the chemical conversion coating at least 10 micrometers. In the case of this example in which the Cr content of the steel was 25%, which was even higher than in Example 6, the average crystal grain diameter of the chemical conversion coating became at least 10 micrometers when the pH of the aqueous solution exceeded 9.2 for potassium tetraborate or 9.4 for sodium tetraborate. When the pH of the aqueous potassium tetraborate solution was 9.0 or above or the pH of the aqueous sodium tetraborate solution was 9.2 or above, it was possible to form a chemical conversion coating with no bare spots or unevenness and an average crystal grain diameter of at least 5 micrometers.

Galling resistance increased as the average crystal grain diameter of the chemical conversion coating increased. Namely, the number of tightenings was 1 when surface conditioning was not carried out, but when the average crystal grain diameter of the chemical conversion coating became at least 5 micrometers as a result of the surface conditioning according to the present invention, the number of tightenings became at least 5, whereby galling resistance was improved to the mark Δ. When the average crystal grain diameter became 10 micrometers or above, the number of tightenings became at least 10, whereby galling resistance was further improved to the mark ○.

Namely, according to the present invention, even with a threaded joint for OCTG made of a high alloy steel having an extremely high Cr content of 25%, which is highly susceptible to galling as evidenced by the comparative example in which the number of tightenings was 1, the striking effect was obtained that at least 10 tightenings and loosenings became possible.

The invention claimed is:

1. A method of manufacturing a steel threaded joint for steel pipes characterized by:
   treating a threaded joint with a surface conditioning solution, which is an aqueous solution containing an alkali metal tetraborate and not containing phosphate ions, and
   directly after the surface conditioning treatment, carrying out a manganese phosphate chemical conversion treatment without washing between the surface conditioning treatment and the manganese phosphate chemical conversion treatment to form a conversion coating with coarse crystal grains having an average crystal grain diameter of 10-110 micrometers on the surface of the threaded joint.

* * * * *